Figure 1:
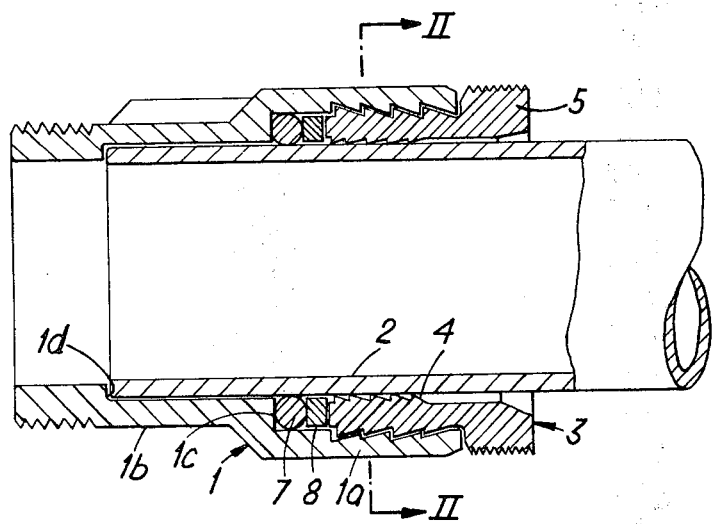

United States Patent [19]

Drori

[11] 4,005,884
[45] Feb. 1, 1977

[54] PIPE COUPLING

[76] Inventor: Mordechai Drori, 89 Zahal St., Kiron, Tel-Aviv, Israel

[22] Filed: Mar. 4, 1975

[21] Appl. No.: 555,092

Related U.S. Application Data

[63] Continuation of Ser. No. 370,742, June 18, 1973, abandoned.

[30] Foreign Application Priority Data

June 21, 1972 Israel .................................. 39734
Sept. 27, 1972 Israel .................................. 40452

[52] U.S. Cl. .............................. 285/323; 285/105
[51] Int. Cl.[2] ........................................ F16L 21/06
[58] Field of Search .......... 285/105, 104, 246, 322, 285/323, 331, 371

[56] References Cited

UNITED STATES PATENTS

| 1,606,188 | 11/1926 | Selah ................................. 285/323 |
| 2,466,526 | 4/1949 | Wolfram ............................ 285/104 |
| 3,409,314 | 11/1968 | Roe ............................... 285/105 X |
| 3,815,940 | 6/1974 | Luckenbill ......................... 285/105 |

FOREIGN PATENTS OR APPLICATIONS

970,887  9/1964  United Kingdom ............... 285/323

*Primary Examiner*—Werner H. Schroeder
*Assistant Examiner*—Peter Nerbun
*Attorney, Agent, or Firm*—Donald M. Sandler

[57] ABSTRACT

A pipe coupling suitable in particular for coupling a pipe of plastic material to a fitting or coupling together a pair of such pipes. The pipe coupling comprises an externally threaded sleeve member formed with one or more inwardly directed protrusions and adapted to receive a pipe to be coupled, an internally threaded collar member into which said sleeve is screwable, at least one of said members being formed or provided with constraining means whereby, with said pipe received within said sleeve the axial movement of said sleeve into said collar results in the protrusions biting into the pipe.

7 Claims, 5 Drawing Figures

PIPE COUPLING

This is a continuation of copending application Ser. No. 370,742 filed June 18, 1973 now abandoned.

This invention relates to a pipe coupling and is particularly concerned with a coupling capable of coupling a pipe formed of a plastics material to a fitting or of coupling together a pair of such pipes. Such pipes are, for example, used for irrigation purposes and it is a requirement that they should be capable of being readily coupled and uncoupled and, when coupled the coupling should be secure and seal tight.

It is an object of the present invention to provide a new form of pipe coupling capable of fulfilling wholly or partially the above referred requirements.

According to the present invention, there is provided a pipe coupling providing a tight seal and a firm clamping action when applied to a pipe, comprising three basic elements, namely; a collar formed with an internal screw-threaded portion adjacent to an open end thereof, and with an internal annular shoulder between the screw-threaded portion and the opposite end of the collar; a sleeve receivable within the collar and having a leading portion receivable within the collar and formed with external screw-threads cooperable with the internal screw-thread of the collar, the sleeve also having a trailing portion formed with a manipulatable element for rotating the leading portion of the sleeve within the collar, at least the leading portion of the sleeve being axially split to permit the radial contraction thereof; and a resilient sealing ring receivable between the internal shoulder of the collar and the end face of the leading portion of the sleeve when the latter is threaded into the collar. The screw-threads of the collar and of the sleeve are formed in cylindrical surfaces of substantially uniform diameter throughout the length of their respective screw-threaded portions, and have a face which slopes towards the trailing portion of the sleeve and the open end of the collar, respectively.

The arrangement is such that when the pipe is disposed within the collar and the sleeve, with the leading portion of the sleeve within the collar and the manipulatable element projecting therefrom, and with the sealing ring interposed between the internal shoulder of the collar and the end face of the sleeve, rotating the sleeve by means of its manipulatable element to move the sleeve axially of the collar assures the following sequence of actions; first, it effects the seal by causing the end face of the sleeve to apply an axial force to the sealing ring to axially compress it and thereby to radially expand it into sealing engagement with the pipe and collar; and then by virtue of the sealing ring and shoulder serving as an abutment limiting the further axial displacement of the sleeve within the collar, causes the mentioned sloping faces of their screw-threads to effect, by a camming action, the radial contraction of the threaded portion of the sleeve to clamp same firmly onto the pipe throughout the length of the sleeve threaded portion.

The pipe coupling described further includes an annular pressure ring interposed between the sealing ring and the end face of the sleeve to transfer the axial force from the latter to the sealing ring along the complete annular surface of the sealing ring. Also, the sleeve is preferably completely split through both its leading end trailing portions.

In accordance with a still further embodiment of this invention the collar is formed integrally with an inner tubular skirt spaced from the threaded inner wall of the collar and defining with the threaded inner wall an annular cylindrical space adapted to receive the sleeve and an end of the pipe.

For a better understanding of the present invention and to show how the same can be carried out in practice reference will now be made to the accompanying drawings in which:

FIG. 1 is a longitudinally sectioned view of a first form of pipe coupling in accordance with the present invention.

Figure 2:
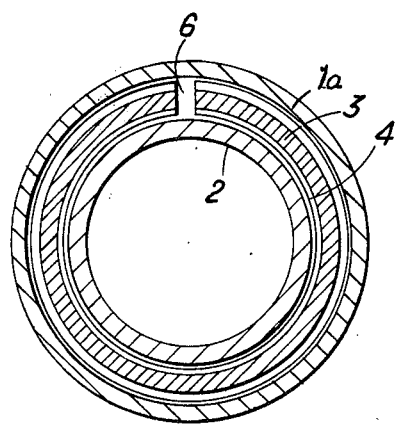
Figure 3:
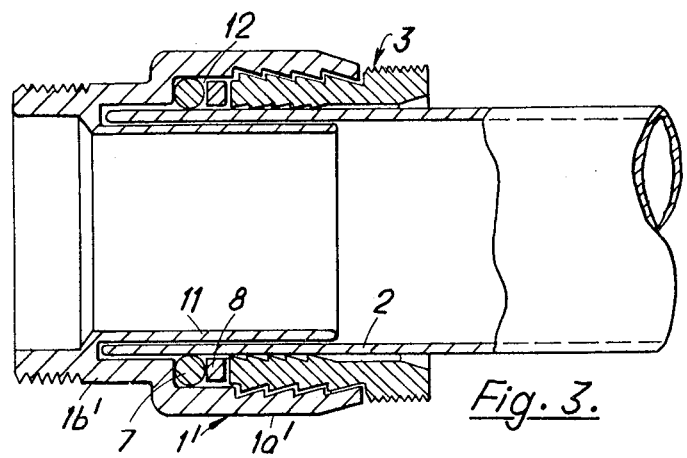
Figure 4:
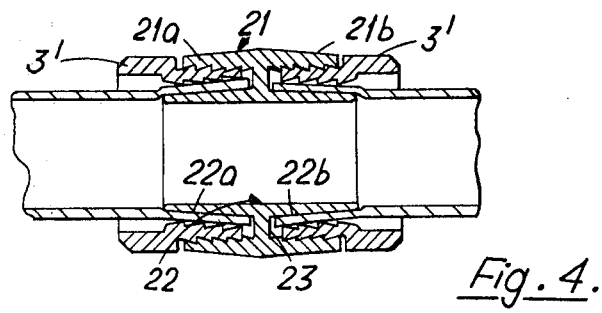
Figure 5:
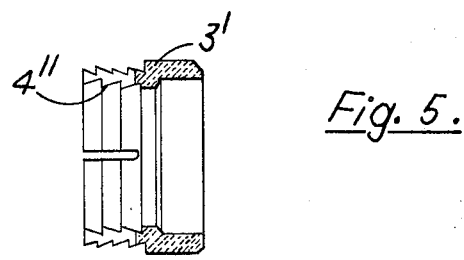

FIG. 2 is a cross-sectional view of the pipe coupling shown in FIG. 1 taken along the line II—II, FIG. 3 is a cross-sectional view of a second form of pipe coupling in accordance with the present invention, FIG. 4 is a longitudinally sectioned view of a third form of pipe coupling in accordance with the present invention, and FIG. 5 is a longitudinally sectioned view of a sleeve for use with any one of the pipe couplings shown in FIGS. 1 to 4.

As seen in FIGS. 1 and 2 of the drawings the pipe coupling comprises a collar member 1 having a first axial portion 1a which is internally threaded over the major portion of its length and a second axial portion 1b of lesser diameter than the portion 1a and separated therefrom by a shoulder 1c. The free end of the axial portion 1b is externally screw threaded so as to permit the screw coupling of the collar member 1 to a fitting as required. Formed in the inner wall of the axial portion 1b is an abutment shoulder 1d which serves as a stop for an inserted pipe 2 to be coupled by the coupling.

A sleeve member 3 formed preferably as a one-piece unit of a plastics material, is externally screw-threaded and is formed on its inner surface with inwardly directed circumferential saw-tooth serrations 4, these external screw-threads constituting the leading portion of the sleeve. The sleeve 3 is provided with a trailing portion constituted by an outwardly directed end flange 5 which is knurled so as to facilitate turning of the sleeve. As can be seen particularly in FIG. 1, the screw-threads in the sleeve and collar members are buttress threads formed in cylindrical surfaces of uniform diameter throughout the length of the respective screw-threaded portions, the back face of each screw-thread turn sloping towards the trailing portion of the sleeve and the open end (right end) of the collar respectively.

As can be seen in FIG. 2 of the drawings the sleeve 3 is axially split through both its leading and trailing portions, there being thereby formed an axial gap 6.

A resillient sealing O-ring 7 and an annular pressure ring 8 are successively located within the collar portion 1a the O-ring 7 abutting the shoulder 1c.

In use the pipe 2 is inserted into the collar 1 until the pipe end abuts the shoulder 1d and the sealing and pressure rings 7, 8 are located in the annular space between the exterior of the pipe and the interior surface of axial portion 1a of collar member 1. Rings 7, 8 are thus located in the annular space between shoulder 1c and the inner end face of sleeve member 3. The inner diameters of the sealing and pressure rings are such that the pipe can easily be inserted therethrough.

The sleeve 3 which surrounds the pipe 2 is now screwed into the collar 1 and the axial displacement of the sleeve 3 into the collar 1 continues until the leading end of the sleeve abuts the pressure ring 8 which, in its turn bears on the sealing ring 7. Once this has occurred continued screw rotation of the sleeve 3 within the collar 1 causes the axial compression of the sealing ring 7, and thereby its radial expansion into sealing engagement with pipe and collar, so as to form an effective tight seal around the pipe 2. When the further axial displacement of the sleeve 3 into the collar 1 is substantially prevented by its abutting the pressure and compressed sealing rings 8 and 7, the external screw threading of the sleeve 3 is displaced with respect to the internal screw threading of the collar 1 with the consequential contraction of the sleeve 3. In other words, the sealing ring and shoulder serve as an abutment limiting the further axial displacement of the sleeve within the collar, causing the sloping faces of the interengaging screw-threads of the sleeve and collar to effect, by a camming action, the radial contraction of the threaded portion of the sleeve for the complete length of the interengaging threads to clamp the sleeve firmly onto the pipe throughout the length of the interengaging threads. As a result the serrations 4 bite into the pipe 2. When the sleeve 3 will have been turned by a maximum amount, for example until the gap 6 therein will have been closed, the serrations 4 will have bitten into the pipe 2 resulting in the firm gripping of the pipe 2 and at the same time, the end of the sleeve 3 presses against the pressure ring 8 and compresses the O-ring 7, causing an effective sealing of the coupling.

As shown in FIG. 1, fluid carried by the pipe may enter the annular space containing rings 7, 8 and exert an axial thrust thereon in a direction tending to expell the sleeve member from the collar member. Such thrust is resisted by the screw-thread connection between these members causing seal 7 to compress against ring 8 and to radially expand increasing the effectiveness of the seal. Additionally, the inclined threads of the sleeve and collar members are thrust against each other causing the sleeve member to be radially compressed thereby further increasing the grip of the coupling on the pipe.

Furthermore whilst in this specific embodiment the sleeve 3 is split along its entire length, a partially split sleeve as shown in FIG. 5 can equally well be employed. As in this case where the serrations 4 consist of peripheral sawtooth-like protrusions it can be arranged that the partially split ring has at least one set of peripheral protrusions intact in which case the intact set of serrations serve to effect a seal as well as to grip and the provision of other sealing means such as an O-ring, can if desired be dispensed with.

Reference will now be made to FIG. 3 of the drawings in which is illustrated a modified form of coupling devices in accordance with the invention. In this embodiment the sleeve 3 is essentially identical with the sleeve 3 shown in FIG. 1 whilst the collar 1 is in principle similar to the collar 1 shown in FIG. 1 but, is in addition, provided with an integrally formed, inwardly located, tubular skirt 11 which extends parallel to the portions 1a and 1b of the collar 1 and is spaced therefrom by an annular spacing 12 which, in the region opposite the wall portion 1b is relatively narrow so as to be capable of receiving the end of the pipe 2 to be coupled and in the region opposite the wall portion 1a is relatively wide so as to be capable of receiving both the pipe 2, the sleeve 3 and the sealing and pressure rings 7-8. As can be seen from the drawing, the tubular skirt 11 is inserted into the pipe 2 to be coupled and therefore constitutes a rigid bearing surface against which the pipe bears thereby ensuring the more effective gripping of the pipe 2 by the saw tooth serrations 4 of the sleeve 3.

Whilst in the embodiments described with reference to FIGS. 1 to 3 of the drawings, the pipe coupling has been shown as serving to couple at one end a pipe 2 and to be adapted for screw connection at an opposite end to an appropriate fitting (not shown), it will be realised that the inventive concept inherent in the coupling described can be readily applied for use in coupling together two pipes of the same or differing diameter. Thus it can readily be envisaged that the externally threaded free end of the coupling collar 1 can be replaced or formed integrally with a further collar portion 1a similar to that shown and an additional split sleeve 3 and, if required, sealing rings be provided.

In all the embodiments hitherto described the sleeves 3 have all been at least partially split and the gripping action has been effected as a consequence of the contraction of the split sleeve 3 which contraction arises out of the relative displacement of the interengaging screw threads of the sleeve and collar. This relative displacement takes place when axial displacement of the sleeve 3 with respect to the collar 1 is prevented as a result of abutment. Such relative displacement of the screw threads can most advantageously be achieved with screw threading of the buttress type as illustrated in the drawings. However other types of screw threads can equally well be employed for this purpose the only screw thread which cannot be used being screw threads of substantially rectangular cross-section.

There will now be described with reference to FIG. 4 of the drawings an embodiment of a pipe coupling in accordance with the invention in which the gripping of the pipe by the sleeve is not dependent on the relative displacement of the screw threads of the sleeve 3 and the collar 1. In consequence there is no limitation on the pin of this threading. Furthermore this gripping is not dependent on contraction of the sleeve 3 and thus the sleeve 3 need not be split either wholly or partially.

In the embodiment shown in FIG. 4 a two-ended coupling device is shown for coupling together two pipe ends. This device comprises a collar 21 which consists of two axial portions 21a and 21b the inner walls of which are respectively formed with oppositely directed screw threading. The axial portions 21a and 21b are formed integrally with a unitary tubular skirt 22 via an integrally formed radial junction piece 23 the walls 22a and 22b of the skirt opposite the inner screw threaded walls of the collar portions 21a and 21b tapering towards the junction piece 23.

In the embodiment shown in FIG. 4 gripping and sealing are effected by means of sleeves 3' basically similar in construction to the sleeve previously described but whose circumferential serrations are of tapering diameters corresponding to the taper of the sleeve. These sleeves 3' need not however be split but if split there should remain at least one intact circumferential serration 4 as shown in FIG. 5 of the drawings, which intact serration serving to provide seal. In practice the pipe ends 2 are inserted into the annular spaces between the skirt and the axial collar portions 22a, 21a, and 22b, 21b. The insertion of the tapering skirt portions into the pipes causes the pipes to flare out towards their ends. Upon a sleeve 3' being screwed into the collar 21 the fact that the pipe end flares ensures that the continued axial displacement of the sleeve 3 into the collar 21 is accompanied by the biting in of the serrations 4 into the pipe. Thus in this case gripping of the pipe is effected as a direct result of the bearing of the pipe end on the conically shaped skirt.

It will be readily appreciated that, where required, the inventive concept exemplified by the double ended coupling illustrated in FIG. 4 can be applied so as to provide a single ended coupling device of the kind as shown in FIGS. 1 to 3 of the drawings. In this case one of the end portions of the double ended coupling device can be replaced by, for example, a threaded collar piece used for coupling the device to a fitting.

Whilst in all the embodiments described above the sleeve has been described as constituting an integral unit, such as unitary sleeve can be replaced for example by two component, coaxial sleeves an outer one being provided with the screw thread designed to engage in the internal screw threading of the collar whilst the inner sleeve being provided with the protrusions adapted to grip the pipe, means being provided for coupling the component sleeves together. Such means can for example be constituted by conical surfaces or interengaging ribs and grooves or the like.

I claim:

1. A pipe coupling producing a tight seal and a firm clamping action when applied to a pipe, comprising:
   A. a collar formed with an internal screw-threaded portion adjacent to an open end thereof, and with an internal annular shoulder between said screw-threaded portion and the opposite end of the collar;
   B. a sleeve having a leading portion receivable within the collar and formed with external screw-threads cooperable with the internal screw-threads of the collar, said sleeve also having a manipulatable trailing portion to be disposed external to the collar to enable screwing the leading portion of the sleeve into the collar, at least the leading portion of the sleeve being axially split to permit the radial contraction thereof and being formed on its inner surface with inwardly directed protrusions;
   C. and a resilient sealing ring of a diameter to be loosely received around the pipe and to be disposed between said internal shoulder of the collar and the end face of the leading portion of the sleeve when the latter is threaded into the collar;
   the screw-threads of the collar and sleeve being formed in cylindrical surfaces of substantially uniform diameter throughout the length of their respective screw-threaded portions and having a sloping back face facing the trailing portion of the sleeve and said open end of the collar, respectively, such that when the pipe is disposed within the collar and the sleeve, with the screw-threads of the leading portion of the sleeve interengaging those of the collar and the manipulatable trailing portion of the sleeve projecting from the collar, and with the sealing ring interposed between the internal shoulder of the collar and said end face of the sleeve, rotating the sleeve by means of its manipulatable trailing portion to displace the sleeve axially of the collar;
   i. first effects the seal by causing the said end face of the sleeve to apply an axial force to the sealing ring to axially compress it and thereby to radially expand it into sealing engagement with the pipe and collar;
   ii. and then, by virtue of the sealing ring and shoulder thereafter serving as an abutment limiting the further axial displacement of the sleeve within the collar, causes the sloping faces of their interengaging screw-threads to effect the radial contraction of the threaded portion of the sleeve for the complete length of the interengaging threads to force the sleeve protrusions into the pipe throughout the length of the said interengaging threads.

2. The pipe coupling as defined in claim 1, further including an annular pressure ring received between the sealing ring and said end face of the sleeve to bridge the split in the sleeve and to transfer the axial force from the latter to the sealing ring uniformly about the complete annular surface of the sealing ring.

3. The pipe coupling as defined in claim 1, wherein the sleeve is axially split through both its leading and trailing portions, and is formed of a one-piece plastics unit.

4. The pipe coupling as defined in claim 1, wherein the collar is formed with a second internal annular shoulder of smaller internal diameter than the first-mentioned shoulder between it and said opposite end of the collar for engaging the end of the pipe when inserted therein.

5. The pipe clamp as defined in claim 1, wherein the manipulatable element on the trailing portion of the sleeve is a manually grippable flange.

6. The pipe coupling as defined in claim 1, wherein the collar is formed with an inner, axially-extending skirt underlying said annular shoulder and spaced therefrom for receiving the end of the pipe.

7. A pipe coupling producing a tight seal and a firm clamping action when applied to a pipe, comprising:
   A. a collar formed with an internal screw-threaded portion adjacent to an open end thereof, and with an internal annular shoulder between said screw-threaded portion and the opposite end of the collar;
   B. a sleeve having a leading portion receivable within the collar and formed with external screw-threads cooperable with the internal screw-threads of the collar, said sleeve also having a manipulatable flange to be disposed external to the collar to enable screwing the leading portion of the sleeve into the collar, at least the leading portion of the sleeve being axially split to permit the radial contraction thereof and being formed on its inner surface with inwardly directed protrusions;
   C. a resilient sealing ring of a diameter to be loosely received around the pipe and to be disposed between said internal shoulder of the collar and the end face of the leading portion of the sleeve when the latter is threaded into the collar; and
   D. an annular pressure ring receivable between the sealing ring and said end face of the leading portion of the sleeve so as to bridge the split therein;
   the screw threads of the collar and sleeve being formed in cylindrical surfaces of substantially uniform diameter throughout the length of their respective screw-threaded portions and having a sloping back face facing the trailing portion of the sleeve and said open end of the collar, respectively, such that when the pipe is disposed within the collar and the sleeve, with the screw-threads of the leading portion of the sleeve interengaging those of the collar and the manipulatable flange of the sleeve projecting from the collar, and with the sealing ring facing the internal shoulder of the collar and the pressure ring facing said end face of the sleeve, rotating the sleeve by means of its manipulatable flange to displace the sleeve axially of the collar;
i. first effects the seal by causing the said end face of the sleeve to apply an axial force via the pressure ring to the sealing ring to axially compress it and thereby to radially expand it into sealing engagement with the pipe and collar;
ii. and then, by virtue of the sealing ring, pressure ring, and shoulder thereafter serving as an abutment limiting the further axial displacement of the sleeve within the collar, causes the sloping faces of their interengaging screw-threads to effect the radial contraction of the threaded portion of the sleeve for the complete length of the interengaging threads to clamp the sleeve firmly onto the pipe throughout the length of the said interengaging threads.

* * * * *